United States Patent (10) Patent No.: US 6,675,007 B2
Tamaki et al. (45) Date of Patent: Jan. 6, 2004

(54) CHARGING METHOD AND TERMINAL EQUIPMENT IN THE INFORMATION AND COMMUNICATION NETWORK SYSTEM

(75) Inventors: Tsuyoshi Tamaki, Hachioji (JP); Masaaki Shida, Hachioji (JP); Tomoaki Ishifuji, Tokyo (JP); Nobukazu Doi, Hachioji (JP); Kazuko Hamaguchi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/061,306

(22) Filed: Feb. 4, 2002

(65) Prior Publication Data

US 2003/0054795 A1 Mar. 20, 2003

(30) Foreign Application Priority Data

Sep. 17, 2001 (JP) ........................................ 2001-280891

(51) Int. Cl.[7] .............................................. H04M 11/00
(52) U.S. Cl. .................... 455/406; 455/405; 455/432.1; 455/11.1; 455/13.1; 455/407; 455/408; 455/435; 379/144.01; 379/144.05; 379/144.06
(58) Field of Search ................................. 455/405, 406, 455/407, 408, 410, 435, 432.1, 11.1, 13.1; 379/144.01, 144.05, 144.06, 114.01

(56) References Cited

U.S. PATENT DOCUMENTS

| | | | | |
|---|---|---|---|---|
| 5,862,471 A | * | 1/1999 | Tiedemann et al. | 455/406 |
| 5,903,833 A | * | 5/1999 | Jonsson et al. | 455/417 |
| 5,999,813 A | * | 12/1999 | Lu et al. | 455/435 |
| 6,058,300 A | * | 5/2000 | Hanson | 455/405 |
| 6,141,531 A | * | 10/2000 | Williams et al. | 455/7 |
| 6,169,895 B1 | * | 1/2001 | Buhrmann et al. | 340/870.07 |
| 6,347,224 B1 | * | 2/2002 | Smyth et al. | 379/112.01 |
| 6,353,730 B1 | * | 3/2002 | Buettner et al. | 340/10.1 |
| 6,466,779 B1 | * | 10/2002 | Moles et al. | 455/410 |

FOREIGN PATENT DOCUMENTS

EP 1 026 853 A1 8/1999

* cited by examiner

Primary Examiner—Sinh Tran
Assistant Examiner—David Q. Nguyen
(74) Attorney, Agent, or Firm—Reed Smith, LLP; Stanley P. Fisher, Esq.; Juan Carlos A. Marquez, Esq.

(57) ABSTRACT

A charging system for use in a network composed of wireless terminals with a repeater function. As each terminal with a repeater function receives a communication session start request from a user terminal, it searches for a destination user terminal; when it finds the destination user terminal, it transfers the signal sent from the requesting user terminal to the destination user terminal without the mediation of base stations. The information about the amount of data thus transferred or communication time for transferring data is sent to the charging system which is under the control of the communications service provider concerned.

4 Claims, 15 Drawing Sheets

CHARGING METHOD AND TERMINAL EQUIPMENT IN THE INFORMATION AND COMMUNICATION NETWORK SYSTEM

BACKGROUND OF THE INVENTION

1. Field of the Invention

The present invention relates to a repeater system which transfers data for user traffic with a repeater function in an information and communication system and a charging method therefor.

2. Description of Related Art

It is well known that a conventional information and communication system uses a charging system which charges according to the communication time and the distance between user terminals (end user terminals), as typically seen in telephone traffic.

FIG. 1 shows the configuration of a mobile communication system model. When an end user terminal 111 calls an end user terminal 113, the end user terminals are connected by a wireless network 105 through base stations 108 and 109 in the area to which the end users belong. In this case, charge calculation equipment 103 performs charging according to the communication time, distance, etc.

The end user terminal 111 can also communicate with an end user terminal 114 through a gateway machine 106, which interconnects the wireless network 105 and a public telephony network 107, by way of a telephone switchboard 110 of the telephony network 107.

The end user terminal 111 can access a server machine 101 of an information service provider through a gateway machine 104 interconnecting the wireless network 105 and the Internet (IP network) 102 in order to receive information service. The charging method for this type of information and communications service is disclosed in European Patent Application Publication EP 1 026 853 A1.

FIG. 2 is an explanatory drawing for a charging method used in an information and communication network. First, an information service provider takes the server registration procedure with a communications service provider to enter information about the server machine 101 in the gateway machine 104 of the communications service provider. When the end user terminal 111 accesses the registered server machine 101, the gateway machine 104 makes a judgment and the charge calculation equipment 103 creates a database of charge. This process establishes a charging system in which the communications service provider charges the utilization fee for information service provider and the utilization fee for communications service provider to the end user, collects the fees and pays the collected utilization fee for information service provider to the information service provider, as shown in FIG. 2.

On the other hand, some network systems, typically private LAN (Local Area Network) and wireless LAN, use their own local networks to provide information and communications service only within the local networks and do not have such a charging system as mentioned above.

Further, another known approach is an ad hoc network in which a group of terminals updates routing information autonomously in a decentralized way; however, there is not any known charging system for such a spontaneous network.

SUMMARY OF THE INVENTION

As stated above, the conventional charging system by which a communications service provider installs charge calculation equipment to charge utilization fees in a predetermined manner does not cover dynamically installed repeater machines as seen in an ad hoc network.

In recent years, as short distance wireless communication systems such as wireless LAN and Bluetooth have been introduced, an end user terminal has become able to have a repeater function for an ad hoc network. With this background, there is demand for a new charging system by which an end user can receive cash back in exchange for the offered repeater function resources including terminal batteries.

According to an aspect of the present invention, the charging method for an information and communication network comprises: user terminals which are owned by users receiving information and communications service; base stations which provide access to the network owned by a communications service provider; repeater machines as terminals with repeater function owned by persons other than the communications service provider, which transfer data between the user terminals and the base stations or between the user terminals; and a charging system to be connected to the network of the communications service provider. As each of the repeater machines receives a communication session start request from a user terminal, it searches for a destination user terminal; when it finds the destination terminal, it transfers the signal sent from the requesting user terminal to the destination user terminal without the mediation of the base stations and sends information about the amount of communication data (data thus transferred) or the communication time for the data transfer to the charging system.

Other aspects of the present invention will be clarified later in the paragraphs which give a detailed description of preferred embodiments of the invention.

BRIEF DESCRIPTION OF THE DRAWINGS

The invention will be more particularly described with reference to the accompanying drawings, in which.

DETAILED DESCRIPTION OF THE PREFERRED EMBODIMENTS

Figure 1:
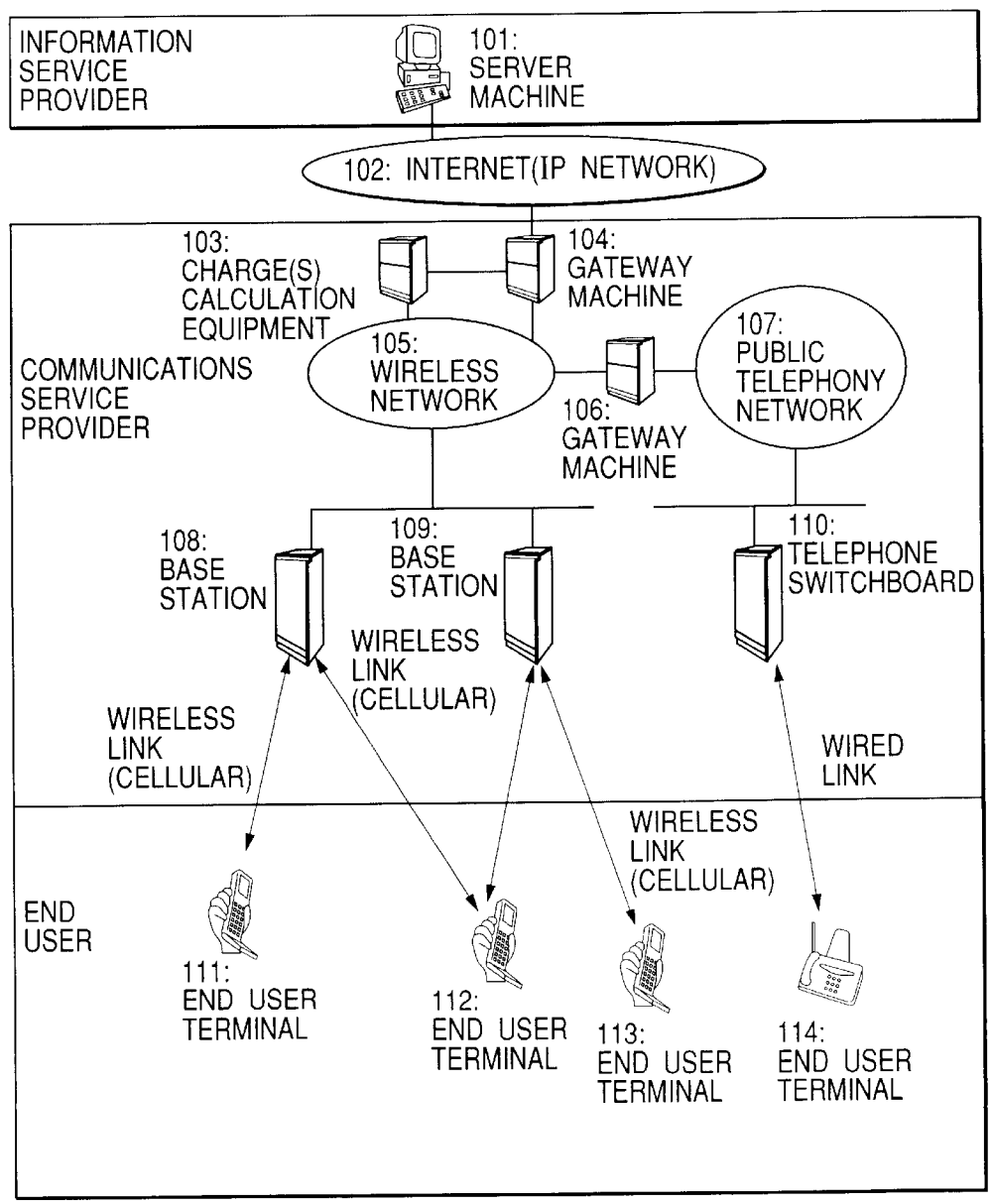
FIG. 1 shows the configuration of a mobile communication system model.
Figure 2:
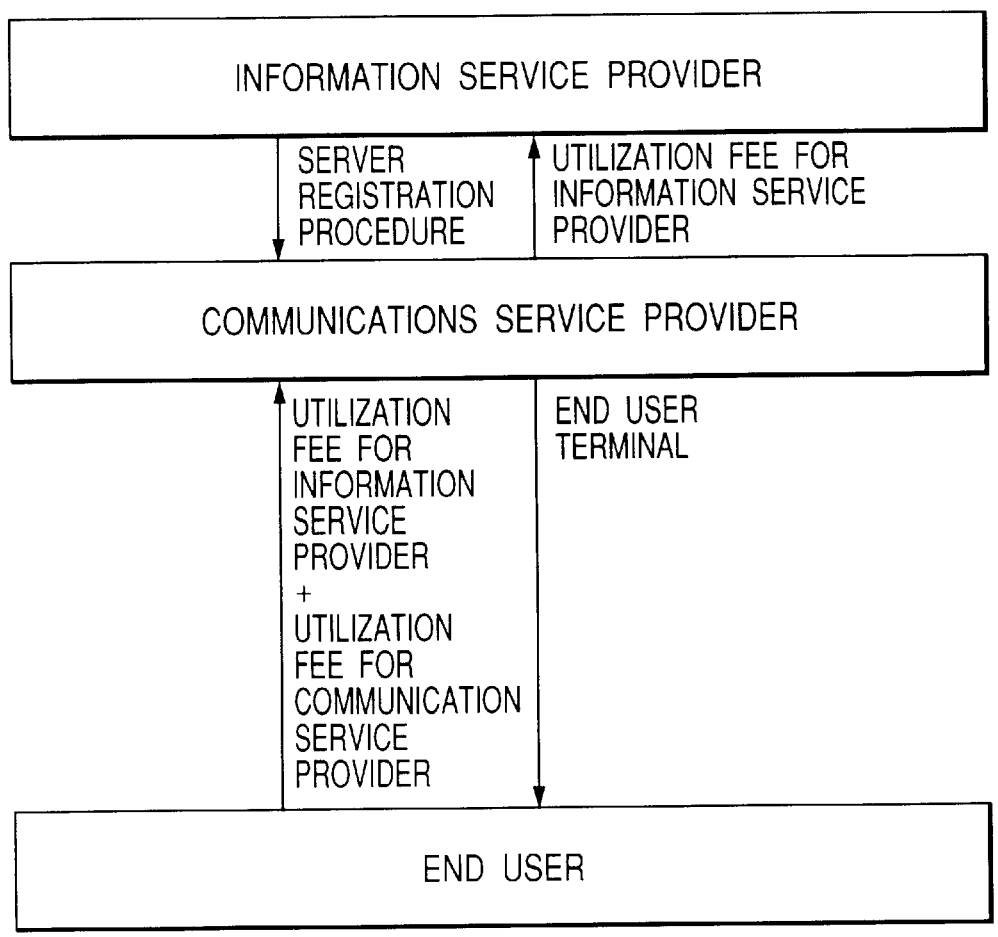
FIG. 2 illustrates a charging method used in an information and communication network.
Figure 3:
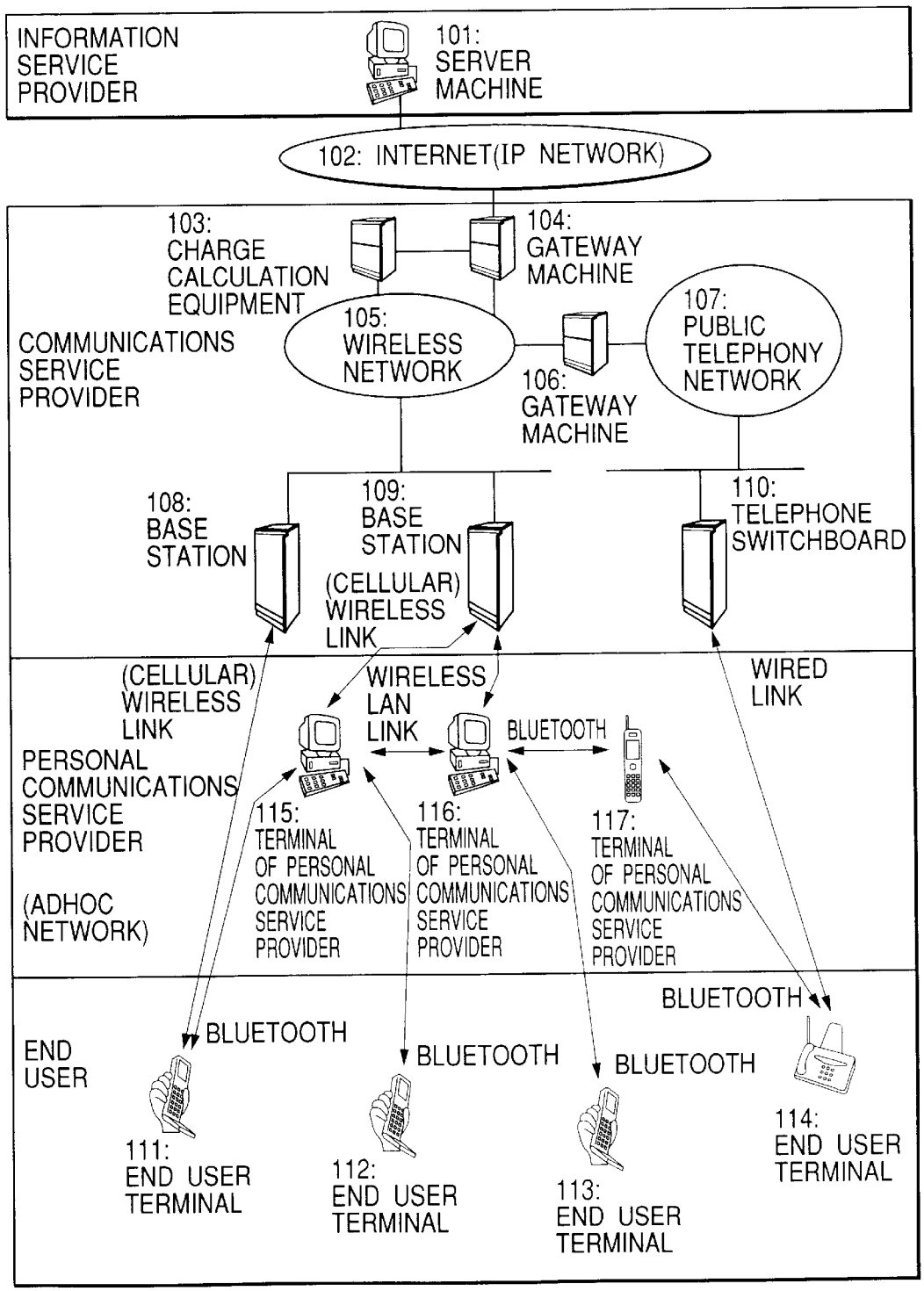
FIG. 3 illustrates a system configuration according to an embodiment of the present invention.

In the following, preferred embodiments of the present invention will be described referring to the accompanying drawings. FIG. 3 shows a system configuration according to an embodiment of the present invention. The system comprises: end user terminals 111, 112, 113, 114 which receive communications service; base stations 108, 109 which connect end user terminals to a wireless network 105 of a communications service provider; personal communications service provider terminals (terminals with repeater function) 115, 116, 117 which transfer data between end user terminals and the base stations 108, 109 and between end user terminals; a wireless network 105 which transfers data between base stations; a gateway machine 104 which interconnects the wireless network 105 and the Internet (IP network) 102; a gateway machine 106 which interconnects the wireless network 105 and a public telephony network 107; a telephone switchboard 110 for the public telephony network 107; and a server machine 101 of an information service provider which provides end user terminals with information service.

For example, when an end user terminal 111 calls an end user terminal 114, the conventional system establishes the following path to the end user terminal 114: the call is connected through the base station 108 to the wireless network 105, then through the gateway machine 106 to the telephone switchboard 110 for the public telephony network 107, from which it is connected to the end user terminal 114. By contrast, according to the present invention, it is possible to make a connection via an ad hoc network of personal communications service provider terminals 115, 116, 117. This means that the communications service provider's equipment is not used so users can receive communications service at a lower price. The personal communications service provider terminals may be either mobile terminals or stationary terminals. In addition, even when the distance from the end user terminal 112 to the base station 109 is long and the end user terminal 112 is out of the communications service area, the communications service provider's service area can be expanded by accessing the base station through the personal communications service provider terminal 115.

Figure 4:
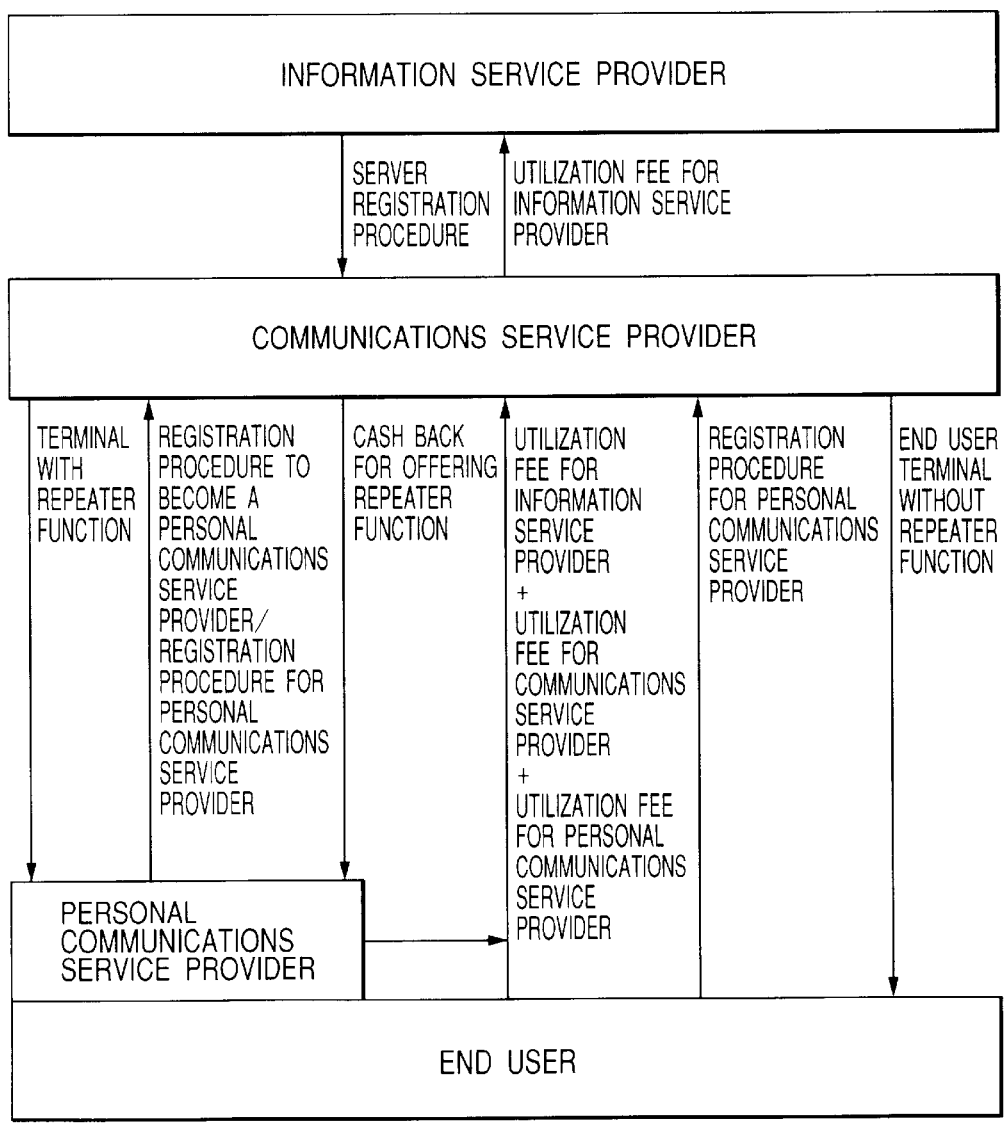
FIG. 4 illustrates a charging method according to an embodiment of the present invention.

FIG. 4 illustrates a charging method according to an embodiment of the present invention. The users who have the terminals with repeater function 115, 116, 117 shown in FIG. 3 are hereinafter called personal communications service providers. Each personal communications service provider is given a terminal with repeater function by taking the registration procedure to become a personal communications service provider. Like end users, personal communications service providers can receive, as users, communications service from the communications service provider. In order to receive low-priced communications service offered by the ad hoc network of terminals with repeater function owned by personal communications service providers, end users and personal communications service providers take the registration procedure for personal communications service provider to become recipients of the service. The end users and personal communications service providers pay three types of fees according to the bill from the communications service provider: a utilization fee for communications service provider, a utilization fee for information service provider and a utilization fee for personal communications service provider. The communications service provider pays back the collected utilization fee for information service provider to the information service provider and gives cash back to personal communications service providers depending on how much they offer their repeater function.

One concrete application example of this business model is service which gives cash back or utilization fee discount to users who purchase mobile terminals with repeater function for a mobile communication system.

Figure 5:
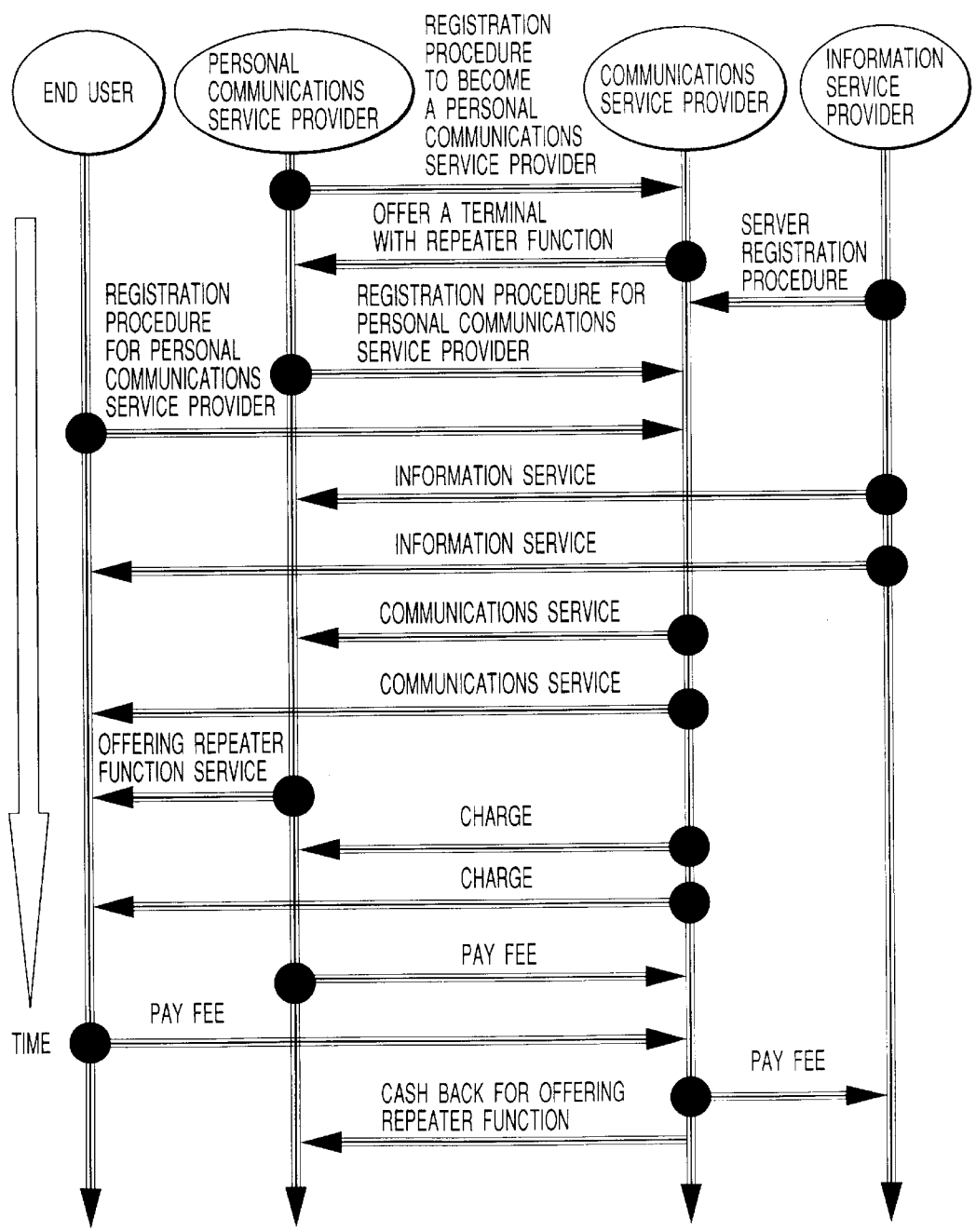
FIG. 5 illustrates a charging process according to an embodiment of the present invention.

Referring to FIG. 5, the charging process according to the present invention will be explained in chronological order. The personal communications service providers are lent or given terminals with repeater function from the communications service provider when they take the registration procedure to become a personal communications service provider, with the communications service provider. In order to receive low-priced communications service offered by the ad hoc network of terminals with repeater function owned by personal communications service providers, the end users and personal communications service providers take the registration procedure for personal communications service provider and make a contract to pay a monthly fee based on the flat rate system to the communications service provider. Now, the end users and personal communications service providers can selectively receive the communications service from the communications service provider, the information service from the information service provider and the low-priced repeater (data transfer) service from the personal communications service providers. The communications service provider collects information about the amount of transferred communication data from the database of charge in each personal communications service provider's terminal with repeater function and calculates cash back for each personal communications service provider as a dividend from the total revenue from collected utilization fees for personal communications service provider, according to the amount of transferred communication data. When charging personal communications service providers, the dividend is deducted from the charge to each personal communications service provider. If the dividend is larger than the charge, the communications service provider transfers the cash back into a bank account specified at the time of the registration procedure to become a personal communications service provider. The communications service provider collects utilization fees on behalf of personal communications service providers and information service providers, so it can add commissions received from them to its revenue.

Figure 6:
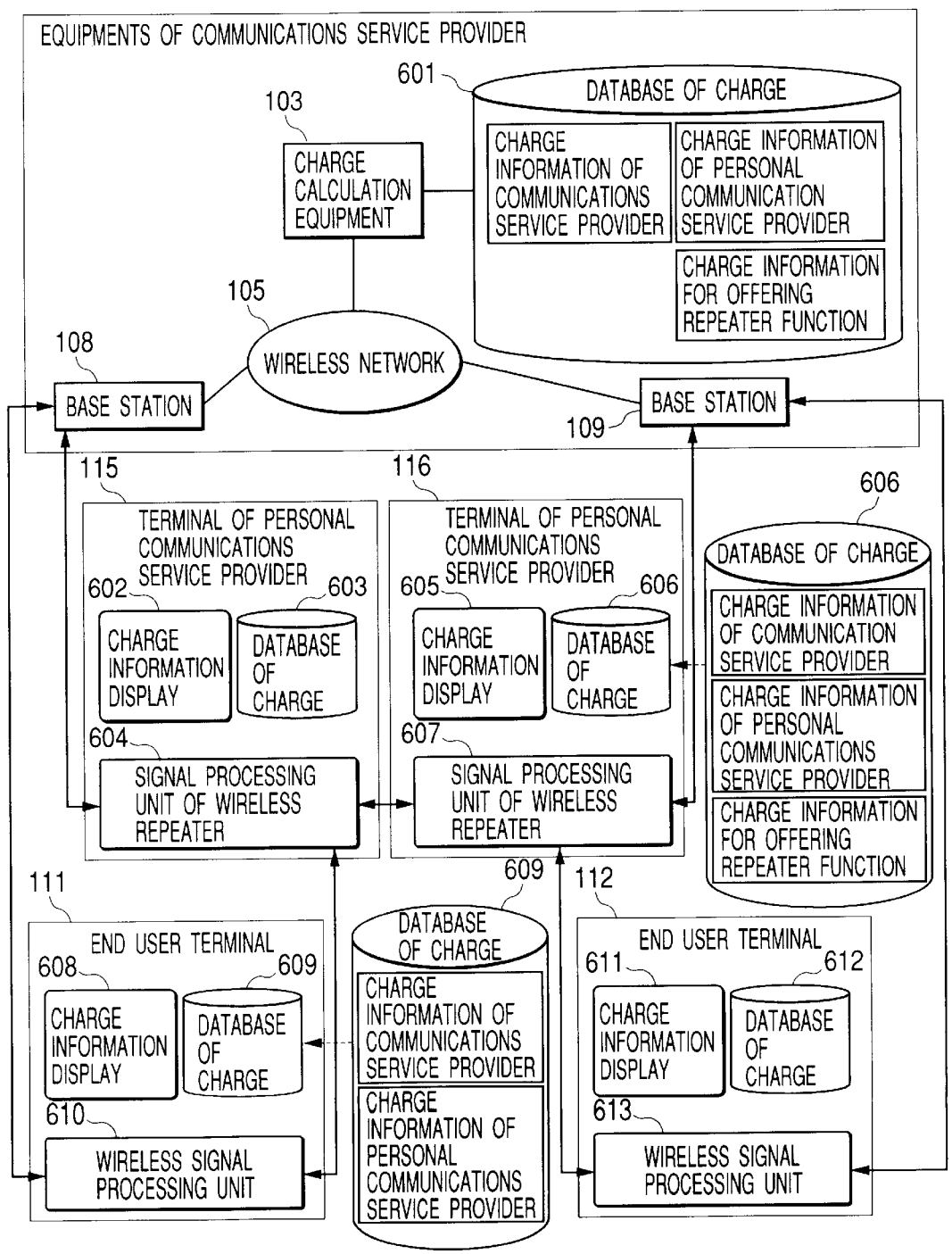
FIG. 6 is a block diagram illustrating a charging system configuration according to an embodiment of the present invention.

FIG. 6 is a block diagram showing the configuration of a charging system according to the present invention. When the end user terminal 111 communicates with the end user terminal 112 by way of the personal communications service providers 115, 116, data is sent from a wireless signal processing unit 610 through wireless repeater signal processing units 604, 609 to a wireless signal processing unit 613. During this process, the end user terminal 111 records the amount of data transferred via the personal communications service providers or the communication time for the data transfer or both in the database of charge 609 as charge information of communications service providers. This database of charge 609 can be displayed on a charge information display 608. Here, the personal communications service provider terminal 116 records the amount of communication data (transferred end user terminal data) and communication time (transfer time) in the database of charge 606 as charge information for offering repeater function service. Similarly, the personal communications service provider 115 records the amount of communication data and communication time in the database of charge 603.

By copying the databases of charge of the personal communications service provider terminals and end user terminals into the database of charge of the charge calculation equipment 103 of the communications service provider, the communications service provider can collect charge information for the ad hoc network of personal communications service provider terminals. Regarding when and how to copy the databases of charge, there are two ways: one is that each of personal communications service provider terminals and end user terminals responds to a call from the charge calculation equipment 103 of the communications service provider, and the other is that each terminal reports to the charge calculation equipment 103 when the amount of data recorded in its database of charge exceeds the database capacity threshold.

Figure 7:
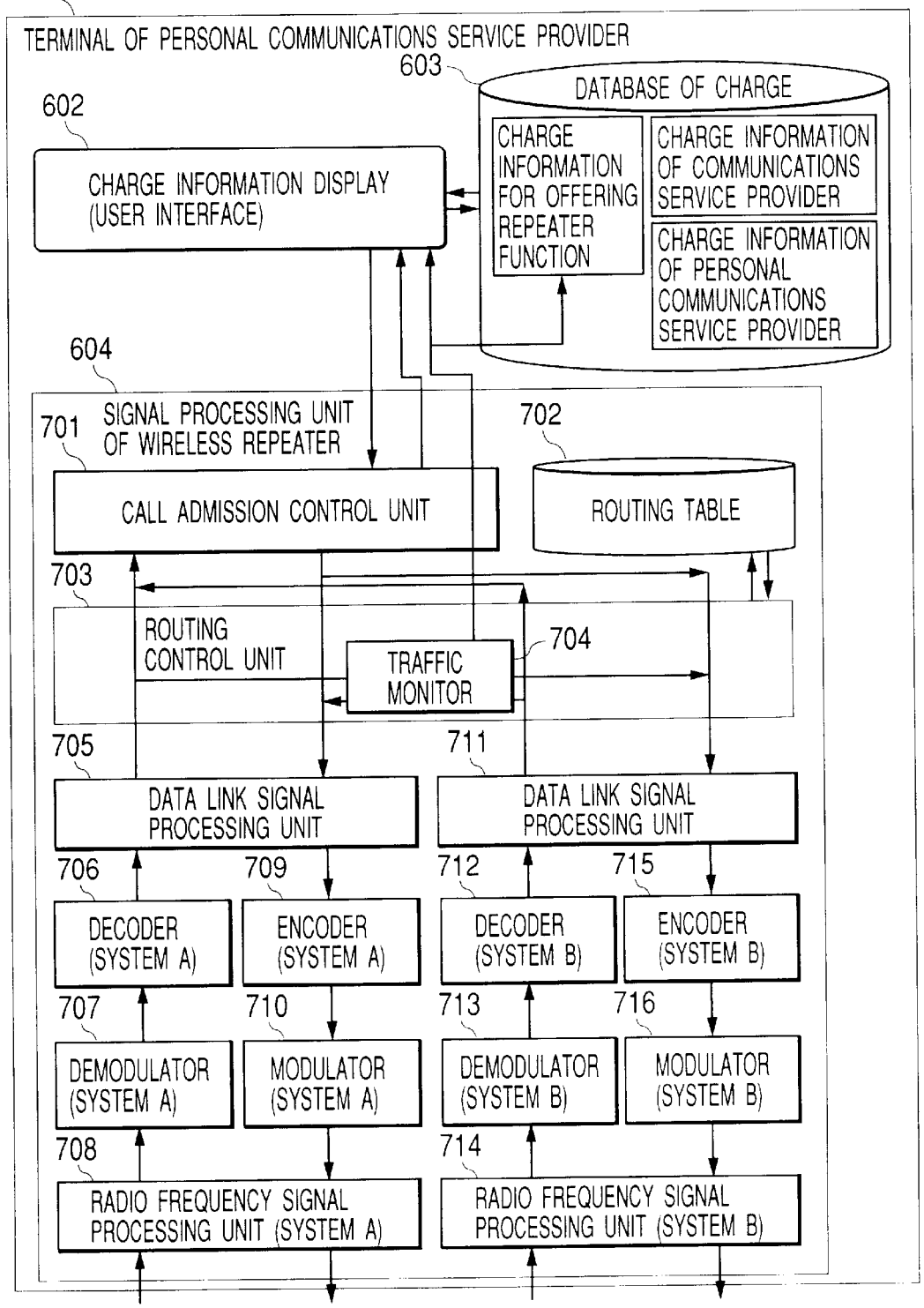
FIG. 7 illustrates a personal communications service provider terminal according to an embodiment of the present invention.

FIG. 7 shows the configuration of a personal communications service provider terminal according to the present invention. For example, in order to cope with two different wireless communication systems such as cellular wireless links and Bluetooth, it has radio frequency signal processing units 708 and 714 and carries out analog to digital signal conversion and vice versa. Base band signal processing is performed as follows. For reception, demodulators 707 and 713 demodulate modulated signals and decoders 706 and 712 detect errors and make corrections. For transmission, encoders 709 and 715 perform encoding for communication channels with added redundancy and modulators 710 and 716 make modulations according to the radio frequency signal processing system employed. Data link signal processing units 705 and 711 disassemble and assemble data packets; a routing control unit 703 transfers data packets to a destination listed in a routing table 702. The routing control unit 703 updates the content of the routing table 702 when it receives a route request packet to make up an ad hoc network. A traffic monitor 704 monitors the amount of communication data and records it in a database of charge 603 as charge information for offering repeater function service. A call admission control unit 701 controls calls issued or received by the personal communications service provider in accordance with a protocol. A charge information display (user interface) 602 displays charge information about the terminal according to the database of charge 603.

Figure 8:
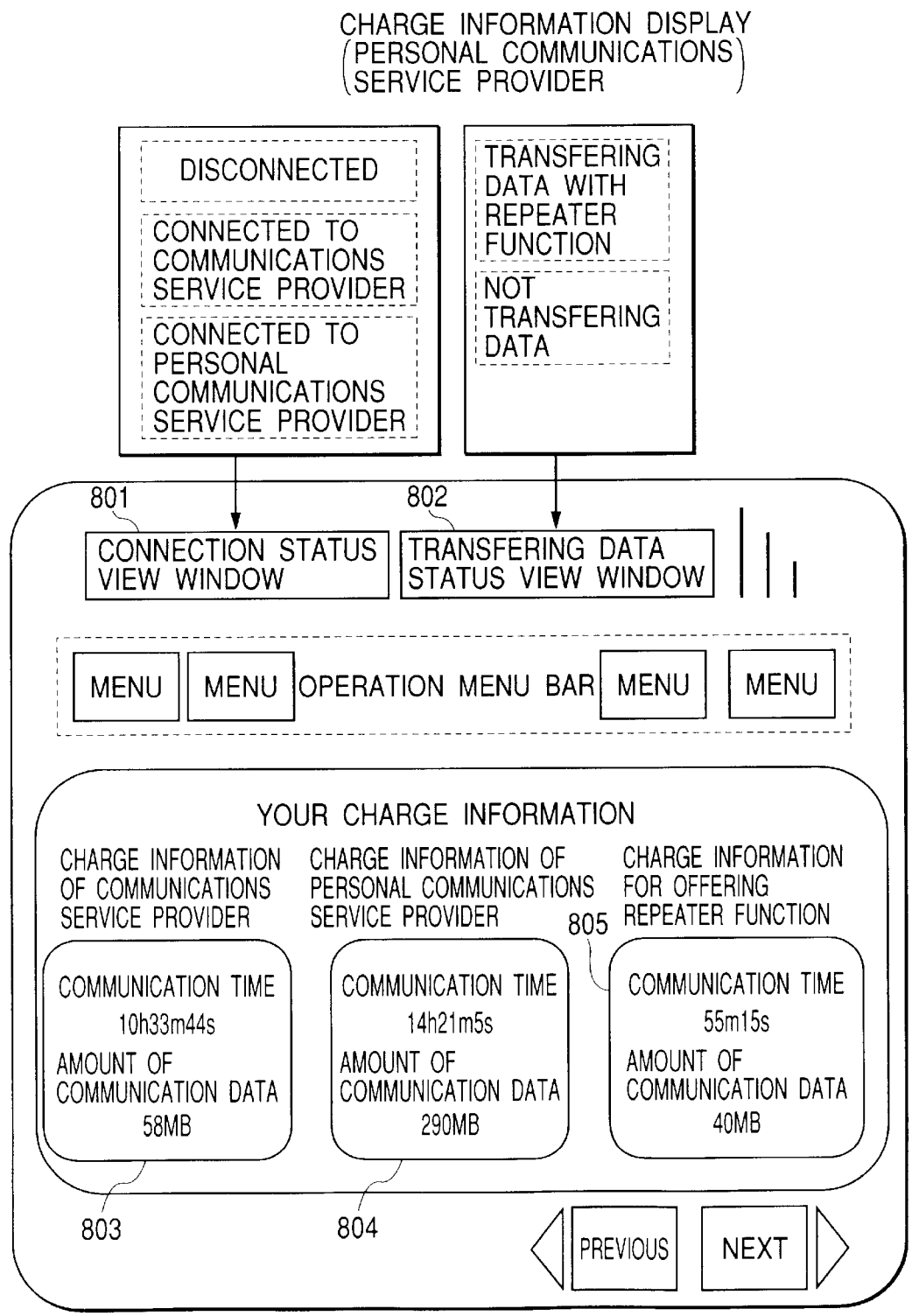
FIG. 8 illustrates a charge information display at a personal communications service provider terminal according to an embodiment of the present invention.

FIG. 8 shows a charge information display at a personal communications service provider terminal according to an embodiment of the present invention. A connection status view window 801 obtains relevant information from the call admission control unit 701 shown in FIG. 7 and displays either of the following status messages depending on the terminal's condition: "disconnected," "connected to communications service provider" and "connected to personal communications service provider (ad hoc network)." A transferring data status view window 802 obtains relevant information from the traffic monitor 704 shown in FIG. 7 and displays whether or not the terminal is transferring data using its repeater function from an end user terminal or another personal communications service provider terminal. As for charge information of communications service provider 803 and charge information of personal communications service provider 804, communication time and the amount of communication data which are recorded in the database of charge 603 by the call admission control unit 701 (FIG. 7) are totalized and displayed. As for charge information for offering repeater function service 805, communication time and the amount of communication data which are recorded in the database of charge 603 by the traffic monitor 704 are totalized and displayed. In this case, it is also acceptable to totalize and display either communication time or the amount of communication data. In charging, for example, on a per-packet basis, it is acceptable to count only the number of transferred packets as the amount of communication data.

Figure 9:
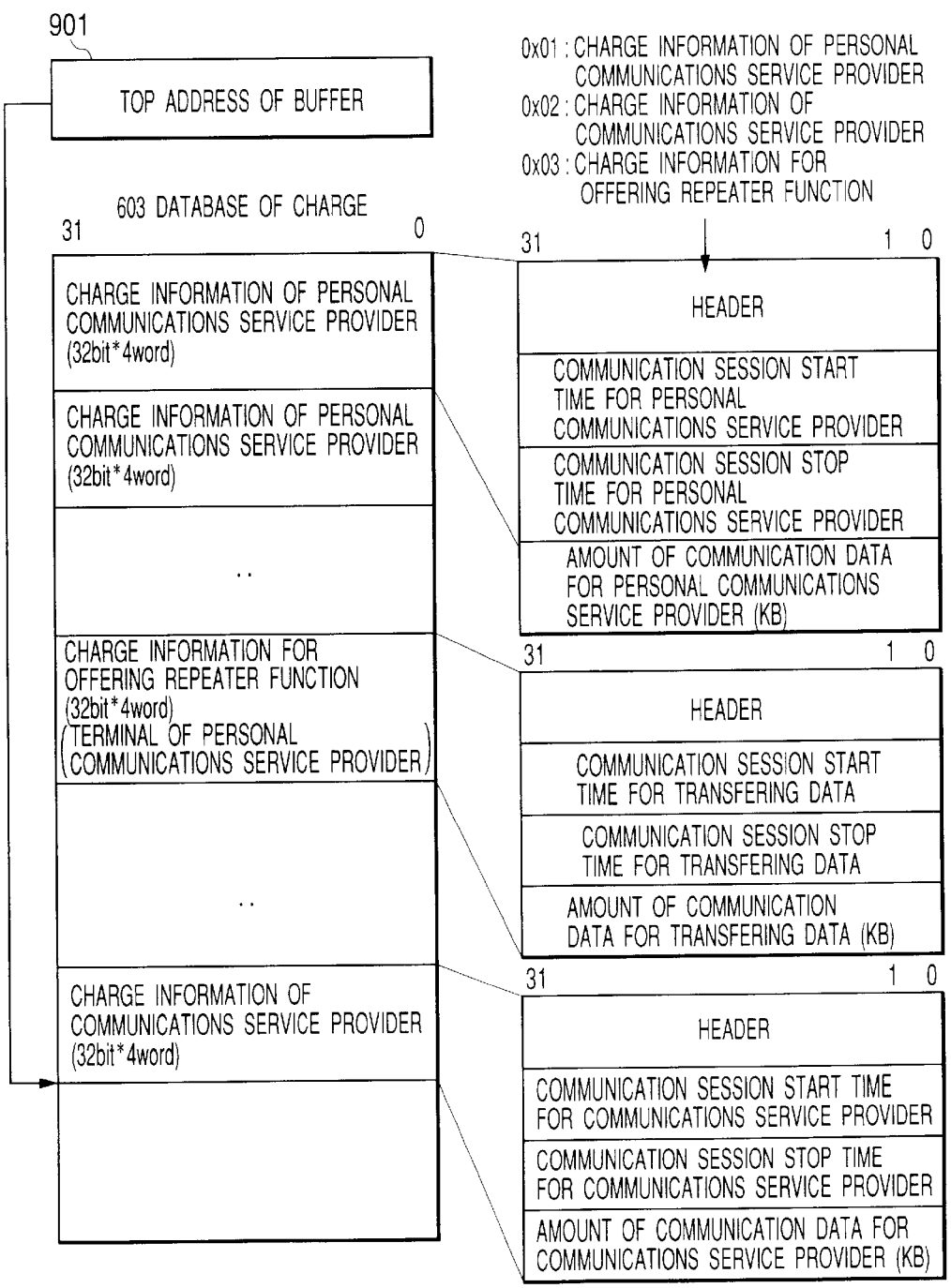
FIG. 9 illustrates a format for a database of charge at a terminal according to an embodiment of the present invention.

FIG. 9 shows a format of a database of charge 603 at a personal communications service provider terminal. The database of charge 603 stores three types of data in combined log form: charge information of communications service provider, charge information of personal communications service provider and charge information for offering repeater function service. Here, 32 bits*4 (words) is treated as a single data segment and each type of charge information includes header, communication session start time, communication session stop time and the amount of communication data. The top address of buffer 901 indicates the top address of the buffer area in which the database of charge is stored and each time one data segment is recorded in the database of charge 603, the top address is updated. The following ring buffer system is used for address management: after the database record reaches the end of the buffer, recording starts again from the top address.

Figure 10:
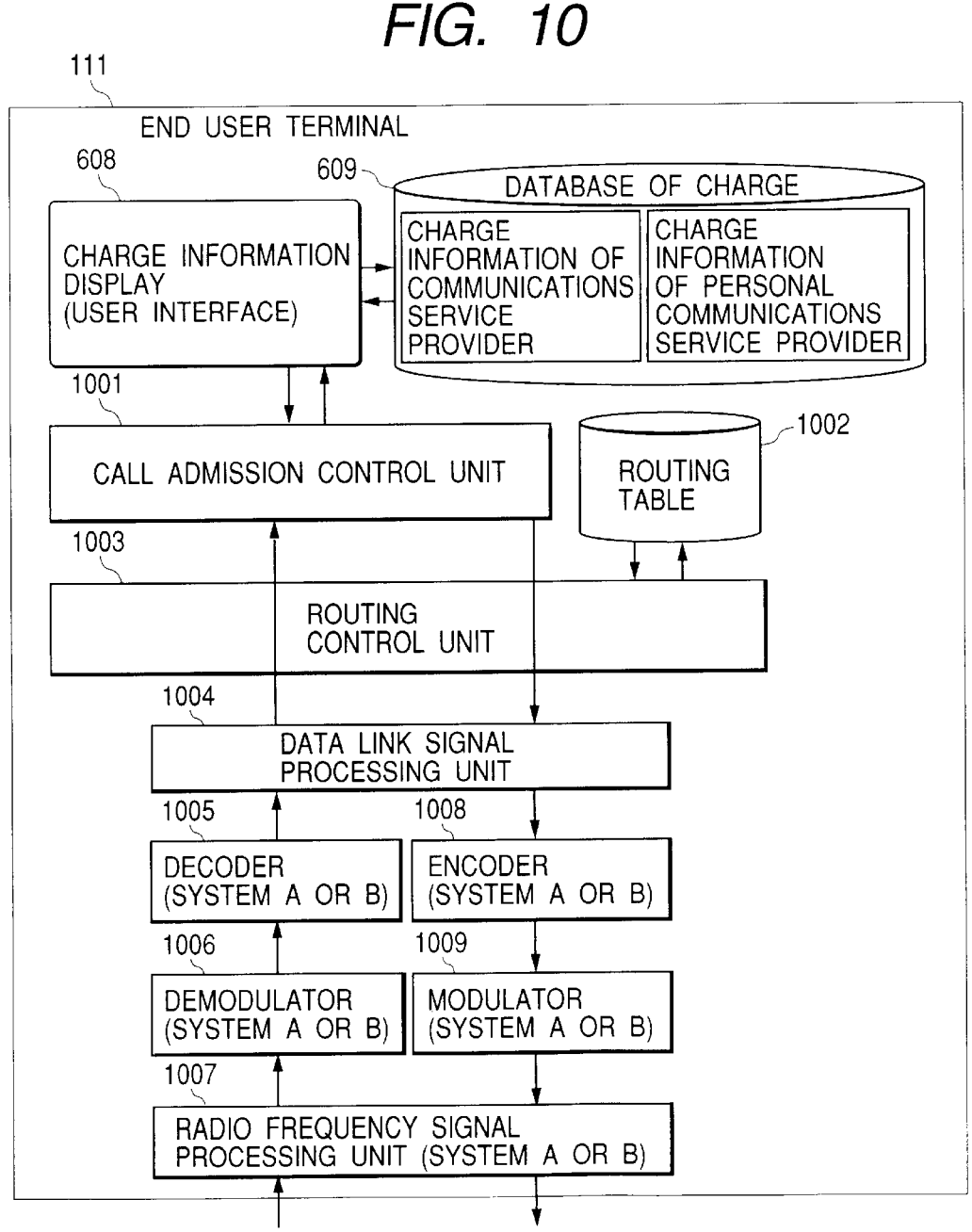
FIG. 10 illustrates the configuration of an end user terminal according to an embodiment of the present invention.

FIG. 10 shows the configuration of an end user terminal. An end user terminal 111 has a radio frequency signal processing unit 1007 which copes with one wireless communication system and carries out analog to digital signal conversion and vice versa. Base band signal processing is performed as follows. For reception, a demodulator 1006 demodulates modulated signals and a decoder 1005 detects errors and makes corrections. For transmission, an encoder 1008 performs encoding for communication channels with added redundancy and a modulator 1009 makes modulations according to the radio frequency signal processing system employed. A data link signal processing unit 1004 disassembles and assembles data packets; a routing control unit 1003 sends data packets to a destination listed in a routing table 1002. A call admission control unit 1001 checks whether it is communication from the communications service provider network or ad hoc network of personal communications service provider terminals, and the check result is used when recording header in the database of charge 609. The database of charge 609 uses the same format as that for personal communications service providers as shown in FIG. 9 except that no charge information for offering repeater function service is included.

Figure 11:
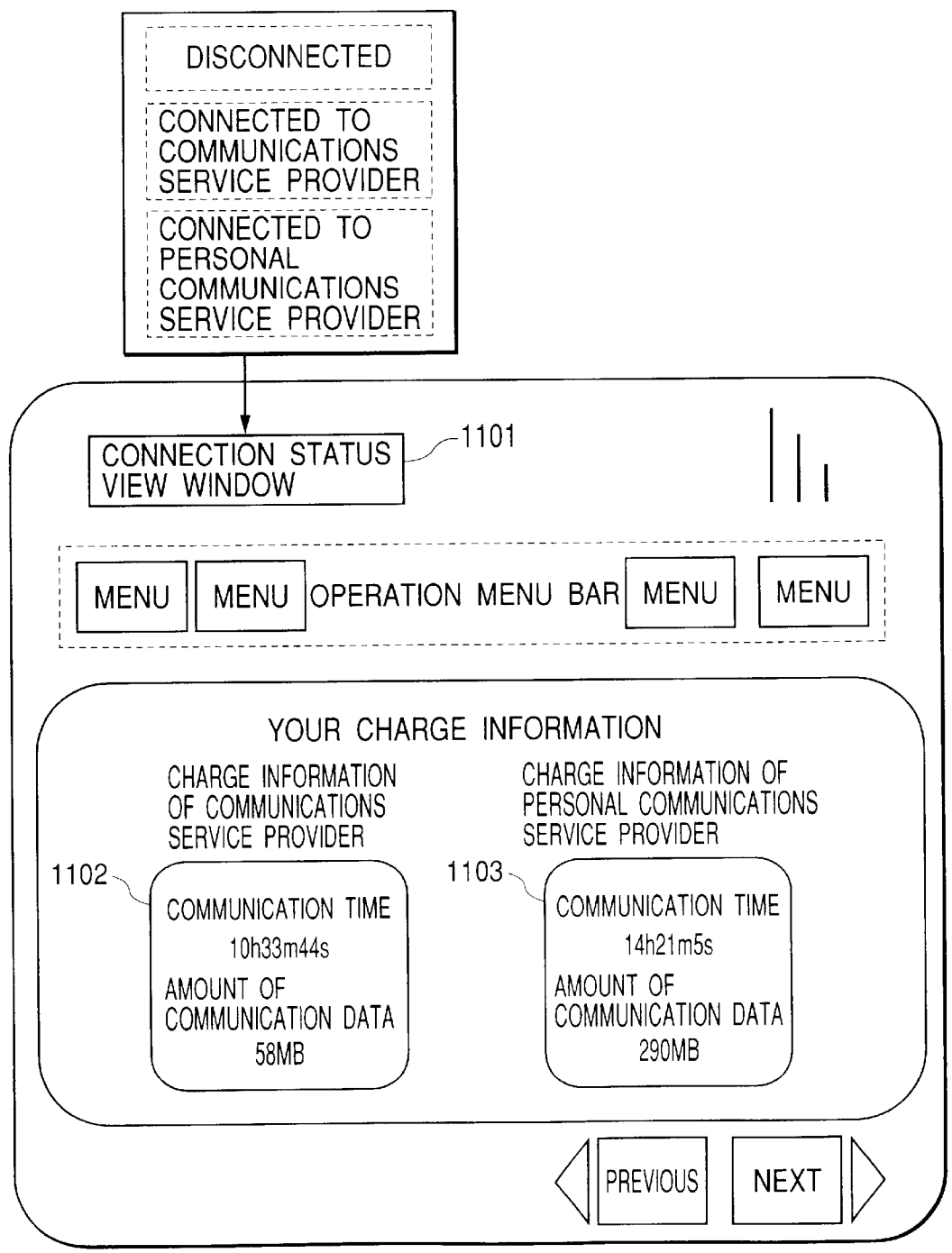
FIG. 11 illustrates a charge information display at an end user terminal according to an embodiment of the present invention.

FIG. 11 shows a charge information display at an end user terminal. A connection status view window 1101 obtains relevant information from the call admission control unit 1001 shown in FIG. 10 and displays either of the following status messages depending on the terminal's condition: "disconnected," "connected to communications service provider" and "connected to personal communications service provider (ad hoc network)." As for charge information of communications service provider 1102 and charge information of personal communications service provider 1103, communication time and the amount of communication data which are recorded in the database of charge 609 by the call admission control unit 1001 (FIG. 10) are totalized and displayed.

Figure 12:
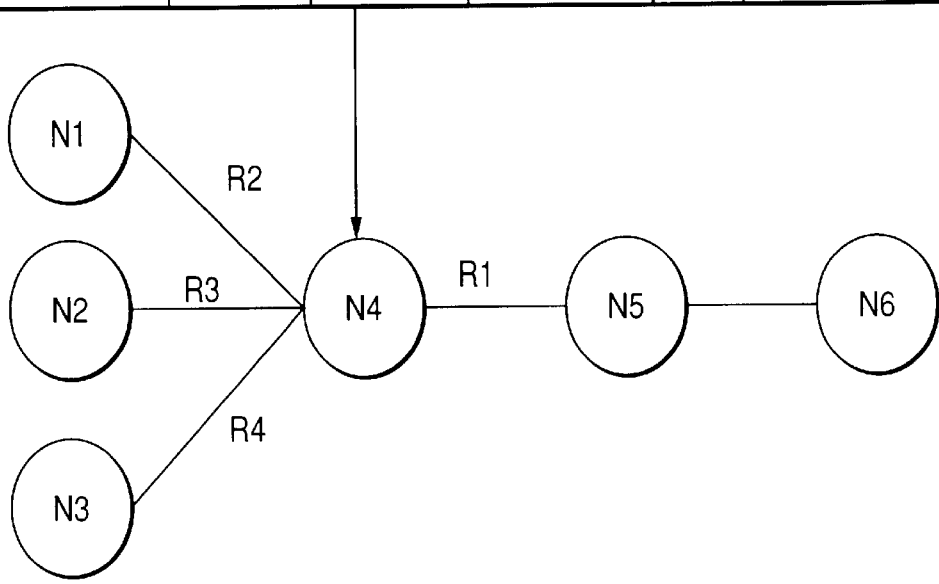
FIG. 12 illustrates a routing table format used in an ad hoc network of personal communications service provider terminals according to an embodiment of the present invention.

FIG. 12 illustrates a routing table format used in an ad hoc network of personal communications service provider terminals. The same routing table format is used by personal communications service provider terminals and end user terminals. In the case shown in FIG. 12, if the destination node is node N6 at node N4, route R1 is used and the node to which the data is transferred next is node N5 and request nodes which request data transfer to node N6 are N1, N2 and N3. In connection with communication with node N6, the routing table at node N4 also includes idle time and average throughput, where the idle time indicates how much time has passed since the last data transfer was finished, and the average throughput denotes the average of communication speeds at which communications with node N6 were made. When the idle time exceeds a threshold, it is deleted as obsolete link data from the routing table. In response to a request from an end user terminal, a personal communications service provider can meet the communication speed requested by the end user terminal in routing by selecting a route according to the average throughput.

Figure 13:
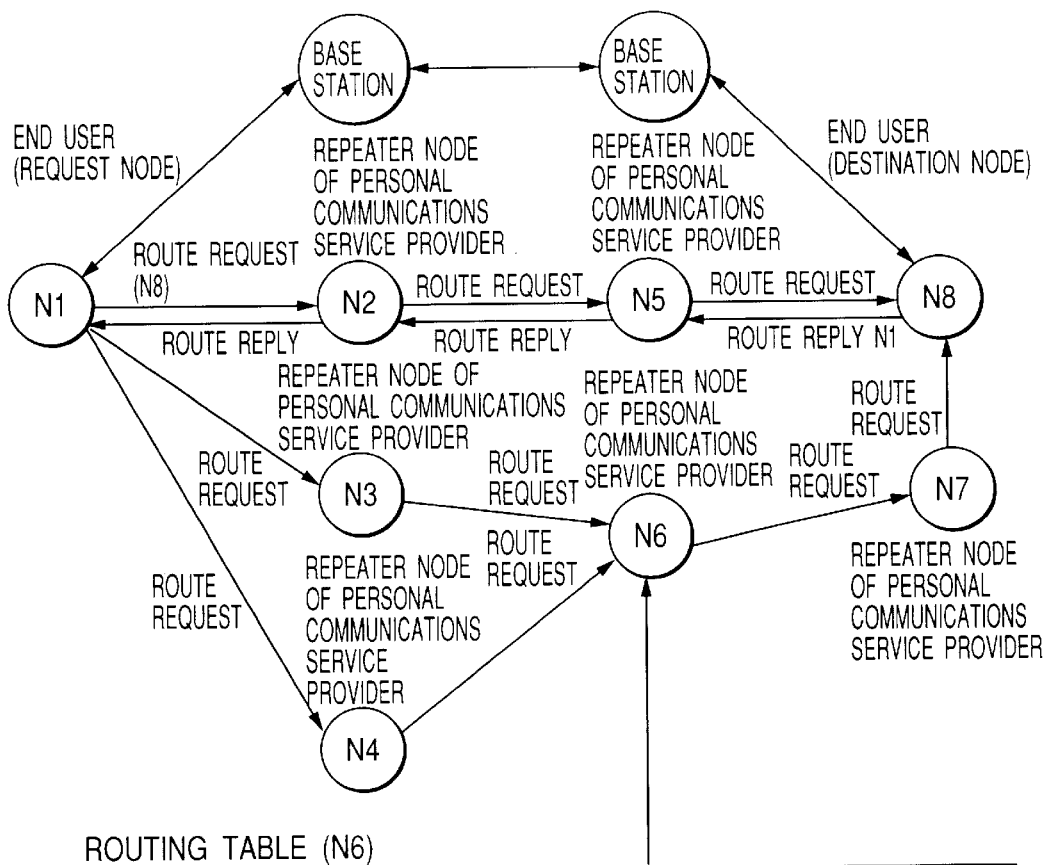
FIG. 13 illustrates a routing process in an ad hoc network of personal communications service provider terminals according to an embodiment of the present invention.

FIG. 13 illustrates a routing process in an ad hoc network of personal communications service provider terminals. When end user terminal N1 issues a call as a request node, first it tries the procedure for connection with the ad hoc network of personal communications service provider terminals; if it fails, it accesses a base station of the communications service provider to make a connection through the wireless network of the communications service provider. In the ad hoc network connection procedure, a link is established as follows: it broadcasts a route request message including the destination node address and requested speed, and the destination node or a repeater node returns a route reply message to the request node.

Figure 14:
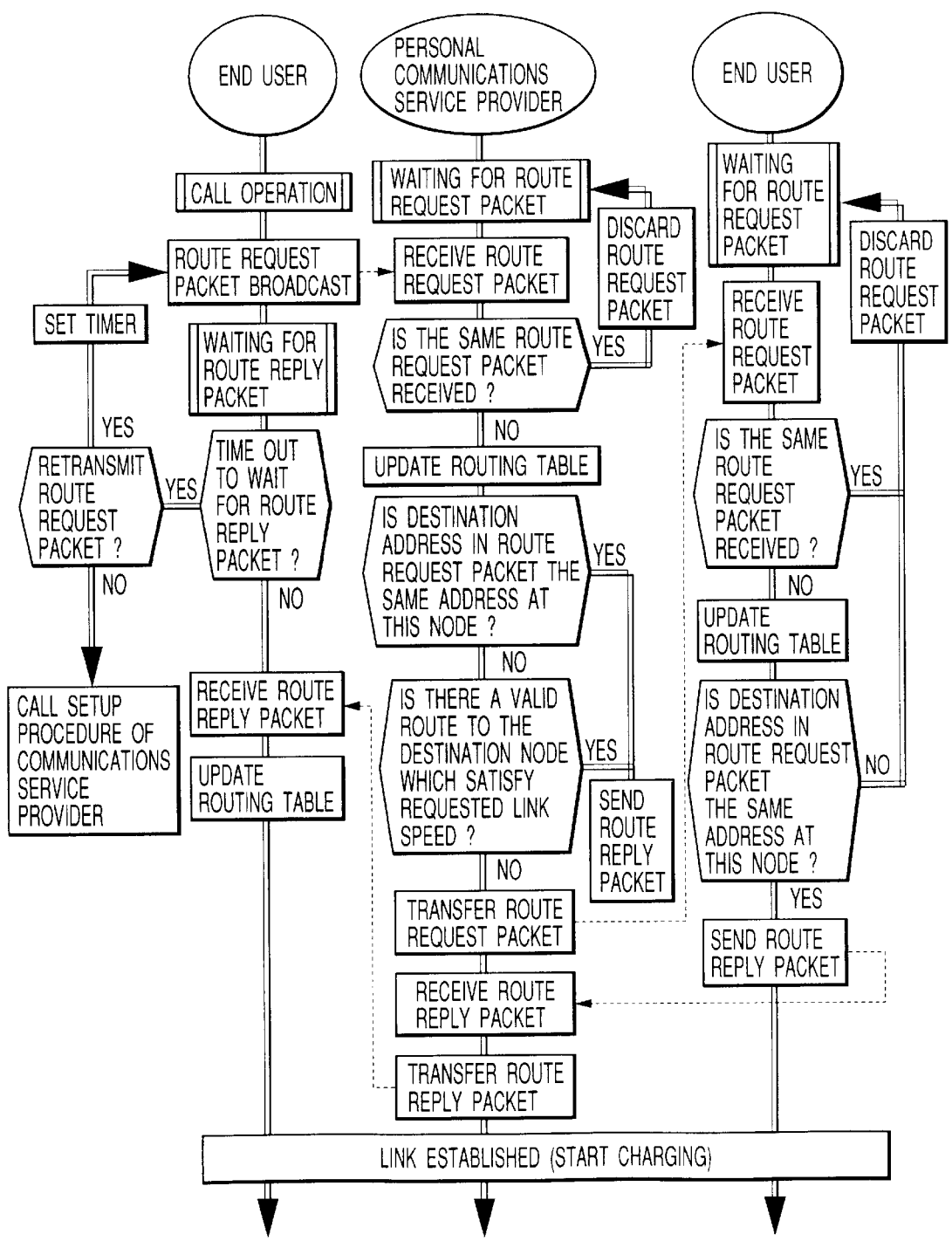
FIG. 14 illustrates an operational flow for the establishment of a link in an ad hoc network of personal communications service provider terminals according to an embodiment of the present invention.

FIG. 14 illustrates an operational flow for the establishment of a link in an ad hoc network of personal communications service provider terminals. First, the request node broadcasts a route request message (packet) and waits for a route reply packet; if the route reply waiting time expires (time out), it extends the route reply waiting time and retransmits a route request packet. If no route reply packet is returned even after retransmissions are made repeatedly to the limit, this is treated as a failure to establish a communication link and the call is processed according to the connection call setup procedure of the communications service provider.

When the personal communications service provider terminal receives the route request packet, it checks whether or not the same route request packet has been received. If so, the route request packet is discarded. If not, the routing table is updated. It searches the routing table to find the destination address to which the route request is addressed. If it fails to find the destination address, it transfers the route request packet. If the destination address is found in the routing table and the idle time is valid or within the limit, it checks whether or not there is a valid route to the destination node which satisfies the requested link speed. If so, it sends back the route reply packet to the request node; if not, it transfers the route request packet.

As the destination node receives the route request packet, it checks whether the same route request packet has been received. If so, the route request packet is discarded. If not, it sends back the route reply packet to the route whose average throughput satisfies the requested link speed. Then, the route reply message traces the route to the request node in the reverse order to reach it; thus a communication link for the ad hoc network is established.

Figure 15:
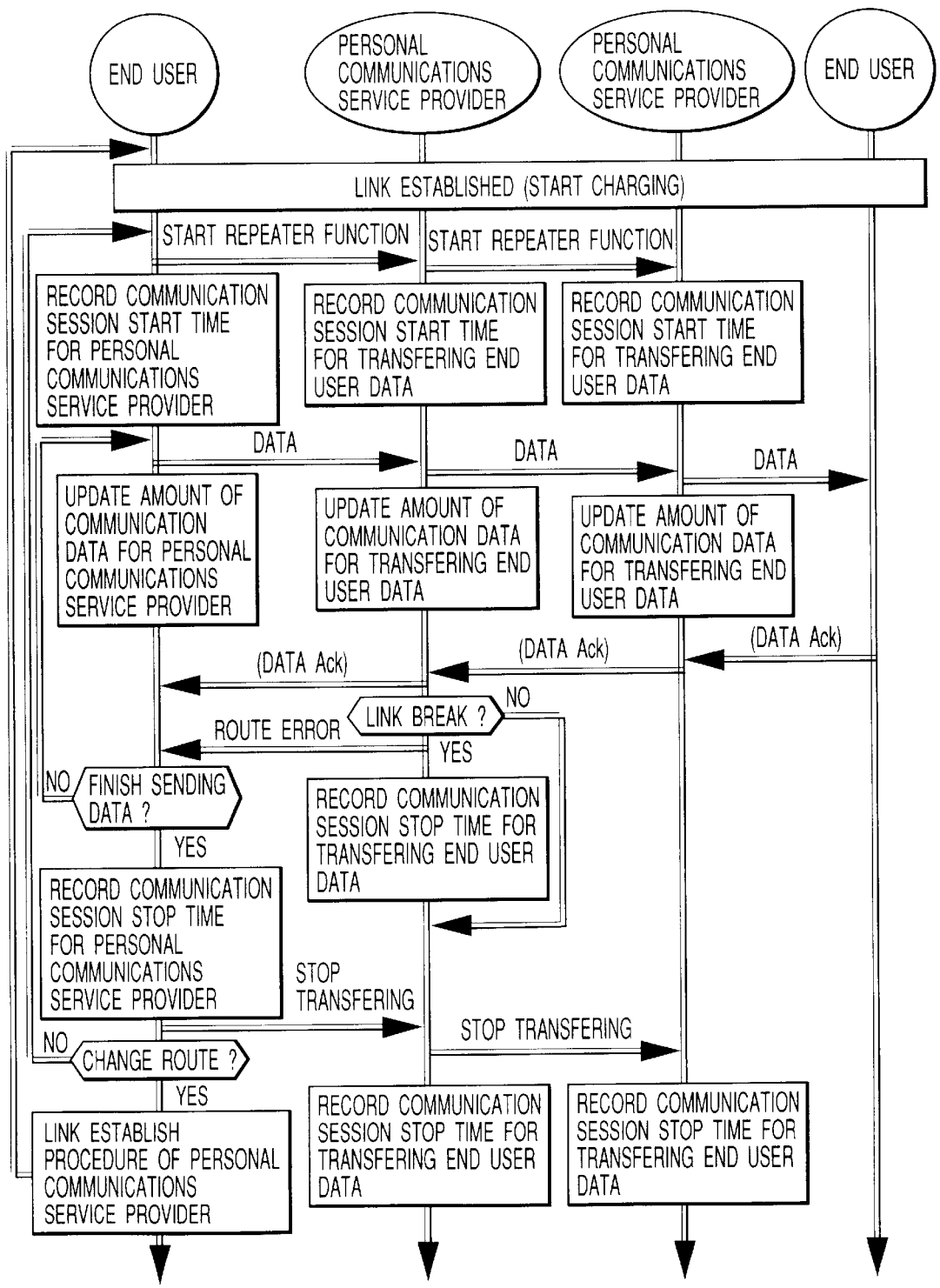
FIG. 15 illustrates a method for recording in a database of charge for personal communications service provider terminals and end user terminals according to an embodiment of the present invention.

FIG. 15 illustrates a method for recording in the database of charge of personal communications service provider terminals and end user terminals. After the communication link is established, the request node expressly sends a repeater function start message. As a consequence, communication session start time for personal communications service provider is recorded in the database of charge of the end user terminal and communication session start time for transferring end user data is recorded in the database of charge of each personal communications service provider terminal. The amount of communication data for personal communications service provider is updated on a per-packet basis at the end user terminal while the amount of communication data for transferring end user data is updated on a per-packet basis at the personal communications service provider terminal. When finishing sending data, a "stop transferring" message is sent; as a consequence, the end user terminal records communication session stop time for personal communications service provider and the personal communications service provider terminal records communication session stop time for transferring end user data. If a route error (link break) occurs somewhere in the data transfer route and a repeater node detects the route error, a route error message is sent to the request node and communication session stop time for transferring end user data is recorded. As the request node receives the route error message, it changes the route as necessary; in that case, rerouting is done following the flow for the establishment of a personal communications service provider link as illustrated in FIG. 14.

As described above, communication session start time, communication session stop time and the amount of communication data are recorded in the databases of charge of personal communications service provider terminals and end user terminals in the format as shown in FIG. 9.

The database of charge 601 shown in FIG. 6 collects individual databases of charge of personal communications service provider terminals and end user terminals. Assuming that n represents the number of users as recipients of service from personal communications service providers and the utilization fee for each user is C yen per month, the total revenue from personal communications service provider service CA is expressed by the following equation:

$$CA = C \times n \tag{1}$$

On the other hand, if charging is done depending on time of utilization of personal communications service provider service, namely on an as-used rate basis (measured rate system), the total revenue CA may be expressed as follows using a function of communication time and the amount of communication data:

$$CA = \Sigma f(PTi, PAi) \tag{2}$$

where PTi represents communication time for which an end user i or a personal communications service provider i uses the ad hoc network of personal communications service provider terminals, and PAi represents the amount of communication data (data transferred using the network). An example of this function f is as shown below:

$$f(PTi, PAi) = a \times PTi + b \times PAi \tag{3}$$

where a represents the fee per hour is and b represents the fee per data.

In this case, cash back Cbi for a personal communications service provider is calculated as follows:

$$Cbi = r \times CA \times Ai / \Sigma Ai \quad (4)$$

$$Cbi = r \times CA \times Ti / \Sigma Ti \quad (5)$$

where Ai represents the amount of communication data for transferring end user data and Ti represents communication time for transferring end user data.

Using the equation (4) or (5), the charge calculation equipment 103 calculates charge. Here, r denotes the ratio of cash back to personal communications service providers to the total revenue from personal communications service provider service; in other words, the commission for the communications service provider is expressed by $(1-r) \times CA$.

The above-mentioned embodiments focus on a business model in which users who purchase terminals with repeater function for a mobile communications system receive cash back or utilization fee discount. Another possible business model is that a representative (personal communications service provider) rents a private line, ADSL, etc from a communications service provider and transfers data from end user homes in the neighborhood by means of wireless LAN links. In this model, the personal communications service provider holds wireless LAN equipment which is connected with the private line, etc and can receive data from homes in the neighborhood by means of wireless LAN links so that it transfers data from homes in the neighborhood using its repeater function. In exchange for such data transfer, it receives cash back from the communications service provider depending on the amount of communication data or communication time for transferring data. The way the charge is calculated is the same as in the above embodiments, namely the equipment has a database of charge to record the amount of communication data or communication time for transferring data. The record on the amount of communication data or communication time for transferring data is sent to the charge calculation equipment of the communications service provider. The charge calculation equipment calculates cash back in the same manner as explained above. Alternatively the value of cash back may be determined depending on the number of users who share the ADSL.

According to the above embodiments, a group of terminals with repeater function can make up an ad hoc network autonomously in a decentralized way so that a communications service provider can charge for traffic which uses this network. A user who has a terminal with repeater function can receive cash back depending on the amount of communication data for transferring data, in exchange for the repeater function it offers. At a site where an event takes place and a concentration of traffic may occur, there will be a large number of terminals with repeater function and therefore a higher quality of connection will be ensured without investment in equipment such as a telephone switchboard. Furthermore, if the utilization fee for the ad hoc network of terminals with repeater function is lower than the utilization fee for communications service provider, end users can enjoy cheaper communications service.

As discussed so far, the present invention provides a charging system in a network of terminals with repeater function.

We claim:

1. A charging method for an information and communication network comprising:
    user terminals which are owned by users receiving communications service;
    base stations which provide access to the network owned by a communications service provider; and
    a charging system to be connected to the network of the communications service provider,
    wherein, at least one of said user terminals is a repeater machine that has a repeater function and transfers data between the user terminals and the base stations or between the user terminals, and
    as the repeater machine receives a communication session start request from a requesting user terminal, it searches for a destination user terminal; when it finds the destination user terminal, an ad hoc network including the repeater machine is formed and the repeater machine transfers the signal sent from the requesting user terminal to the destination user terminal without the mediation of the base stations and sends the charging system information about the amount of communication data or communication time for transferring data.

2. The charging method as claimed in claim 1, wherein the charging system calculates charge to be paid to the owners of the repeater machines depending on the amount of communication data or communication time for transferring data.

3. The charging method as claimed in claim 1, wherein the repeater machines, which store, in the memory, information about the amount of communication data or communication time for transferring data, sends the charging system the stored information about the amount of communication data or communication time for transferring data, when a request is issued from the charging system.

4. The charging method as claimed in claim 1, wherein the repeater machines, which store, in the memory, information about the amount of communication data or communication time for transferring data, sends the charging system the stored information about the amount of communication data or communication time for transferring data, when the amount of communication data or communication time for transferring data exceeds a prescribed level.

* * * * *